Sept. 28, 1965 L. J. KMIECIK ETAL 3,209,297
LEVEL CONTROLLED SWITCH MECHANISM
Filed April 26, 1963 3 Sheets-Sheet 1

INVENTORS.
Leopold J. Kmiecik,
Elwood H. Stonich,
By Brown, Jackson, Boettcher & Dienner
Attys.

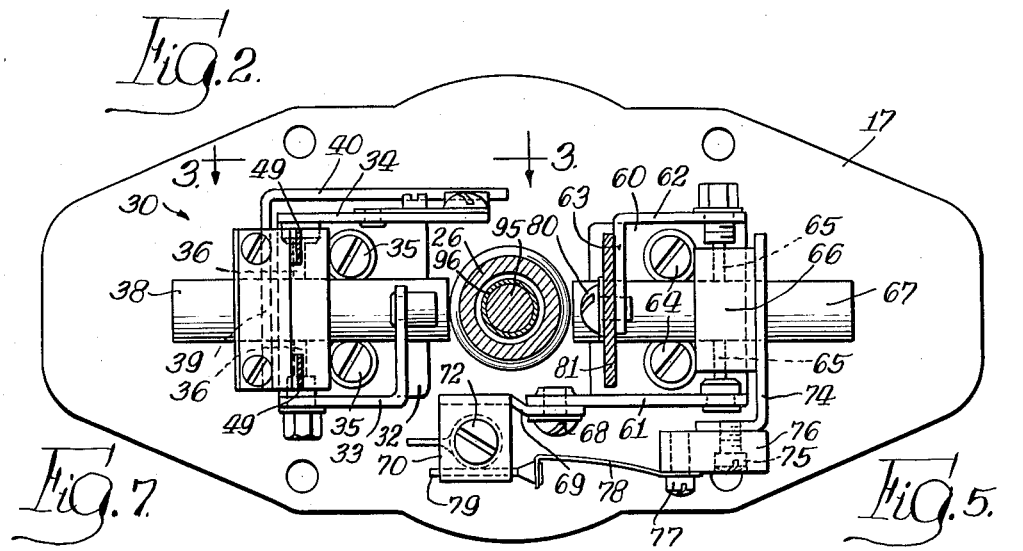

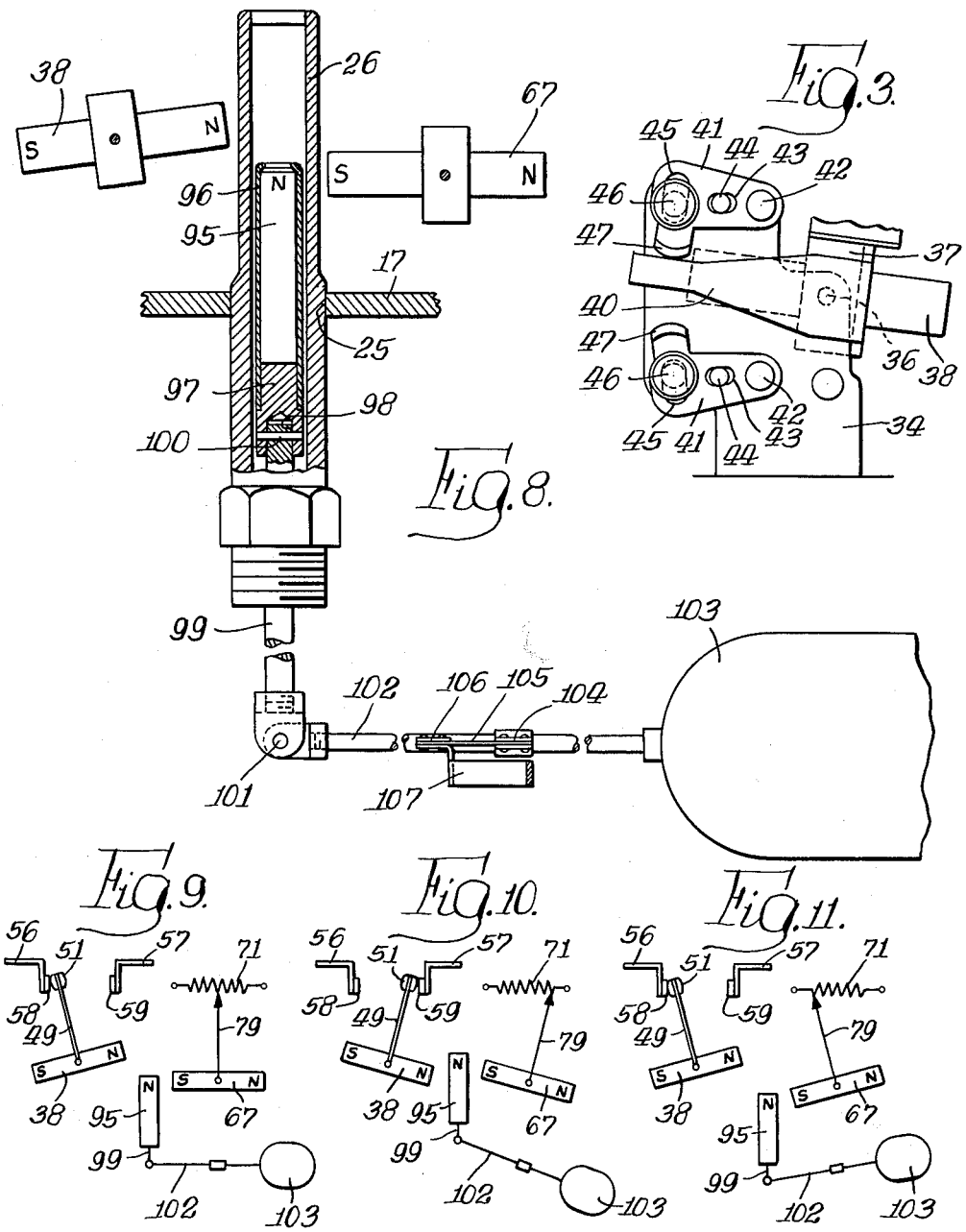

the boiler. A secondary bar magnet is mounted exteriorly of the tubular enclosure and has one pole disposed adjacent the unlike pole of the primary magnet whereby the poles attract each other so that the secondary magnet moves in response to movement of the primary magnet. The secondary magnet is provided with a contact arm that is movable over a rheostat connected in the circuit of the proportioning valve for effecting a modulating control thereof in relation to liquid level changes in the boiler. A tertiary bar magnet is also mounted exteriorly of the tubular enclosure and has one pole disposed adjacent the like pole of the primary magnet whereby the poles repel each other causing movement of the tertiary magnet in response to movement of the primary magnet. The tertiary magnet serves to actuate switch means connected in the circuits of the burner and the alarm system for effecting control thereof in relation to liquid level changes in the boiler. Our present invention is an improvement in the Level Controlled Switch Mechanism disclosed in Patent No. 2,671,834 granted to Leopold J. Kmiecik on March 9, 1954.

United States Patent Office 3,209,297
Patented Sept. 28, 1965

3,209,297
LEVEL CONTROLLED SWITCH MECHANISM
Leopold J. Kmiecik, Lincolnwood, and Elwood H. Stonich, Chicago, Ill., assignors to McDonnell & Miller, Inc., Chicago, Ill., a corporation of Delaware
Filed Apr. 26, 1963, Ser. No. 276,011
6 Claims. (Cl. 338—33)

Our present invention relates to control mechanism comprising potentiometer and switch means adapted to be actuated by means responsive to variations in liquid level in a pressure vessel such as a boiler or the like.

In the case of boilers and the like in general, and high pressure boilers in particular, wherein provision is made for supplying feedwater under pressure to the boiler, it is desirable to regulate the rate of flow of the feedwater to the boiler so as to control the water level therein. Ideally, the load on the boiler and the supply of feedwater should be balanced. Thus, as the load on the boiler increases and the water level falls, the flow of water to the boiler should be increased. Conversely, as the load on the boiler decreases and the water level rises, the flow of water to the boiler should be decreased. To accommodate these requirements, an electrically controlled proportioning valve may be placed in the feedwater supply line. It is also desirable to arrange for the de-energization of the burner used to heat the water in the boiler, and for the energization of a visual or audible alarm system indicating the shutting off of the burner, when the water level falls below a predetermined level.

It is an object of our present invention to provide in a system of the character described control mechanism for regulating the electrically controlled proportioning valve, the burner and the alarm system, in response to variations in liquid level in the pressure vessel of the boiler.

It is another object of our present invention to provide in a system of the character described control mechanism comprising potentiometer means actuated in response to variations in liquid level in the boiler for affording a modulating control of the electrically controlled proportioning valve.

It is still another object of our present invention to provide in a system of the character described control mechanism comprising switch means actuated in response to variations in liquid level in the boiler for controlling energization of the burner and the alarm system.

It is a further object of our present invention to provide control mechanism, as described, wherein a system of magnets are employed for actuating the potentiometer means and the switch means.

It is a still further object of our present invention to provide control mechanism, as described, wherein the system of magnets comprises a potentiometer actuating magnet and a switch actuating magnet located outside the pressure vessel, both of which magnets are responsive to motion of a magnet located inside the pressure vessel.

In the preferred embodiment of our invention, we provide a tubular enclosure of non-magnetic material in which is disposed a primary two-pole bar magnet movable by a float member in response to liquid level changes within the boiler. A secondary bar magnet is mounted exteriorly of the tubular enclosure and has one pole disposed adjacent the unlike pole of the primary magnet whereby the poles attract each other so that the secondary magnet moves in response to movement of the primary Now in order to acquaint those skilled in the art with the manner of constructing and using control mechanisms in accordance with the principles of our present invention, we shall describe in connection with the accompanying drawings a preferred embodiment of our invention.

In the drawings:

FIGURE 2 is a horizontal sectional view, taken substantially along the line 2—2 in FIGURE 1, looking in the direction indicated by the arrows, with portions being removed for the sake of clarity;

FIGURE 3 is a partial elevational view, taken substantially along the line 3—3 in FIGURE 2, looking in the direction indicated by the arrows;

FIGURE 5 is a generally vertical sectional view, taken substantially along the line 5—5 in FIGURE 1, looking in the direction indicated by the arrows;

FIGURE 6 is a partial horizontal sectional view, taken substantially along the line 6—6 in FIGURE 1, looking in the direction indicated by the arrows, with portions being removed for the sake of clarity;

FIGURE 7 is a partial horizontal sectional view, taken substantially along the line 7—7 in FIGURE 1, looking in the direction indicated by the arrows;

FIGURE 8 is a partial elevational view of the magnet system and float actuating means therefor of the control mechanism of our present invention, with portions being broken away and shown in section; and FIGURES 9, 10 and 11 are diagrammatical views of various operating positions of the basic elements of the control mechanism of our present invention.

Figure 1:
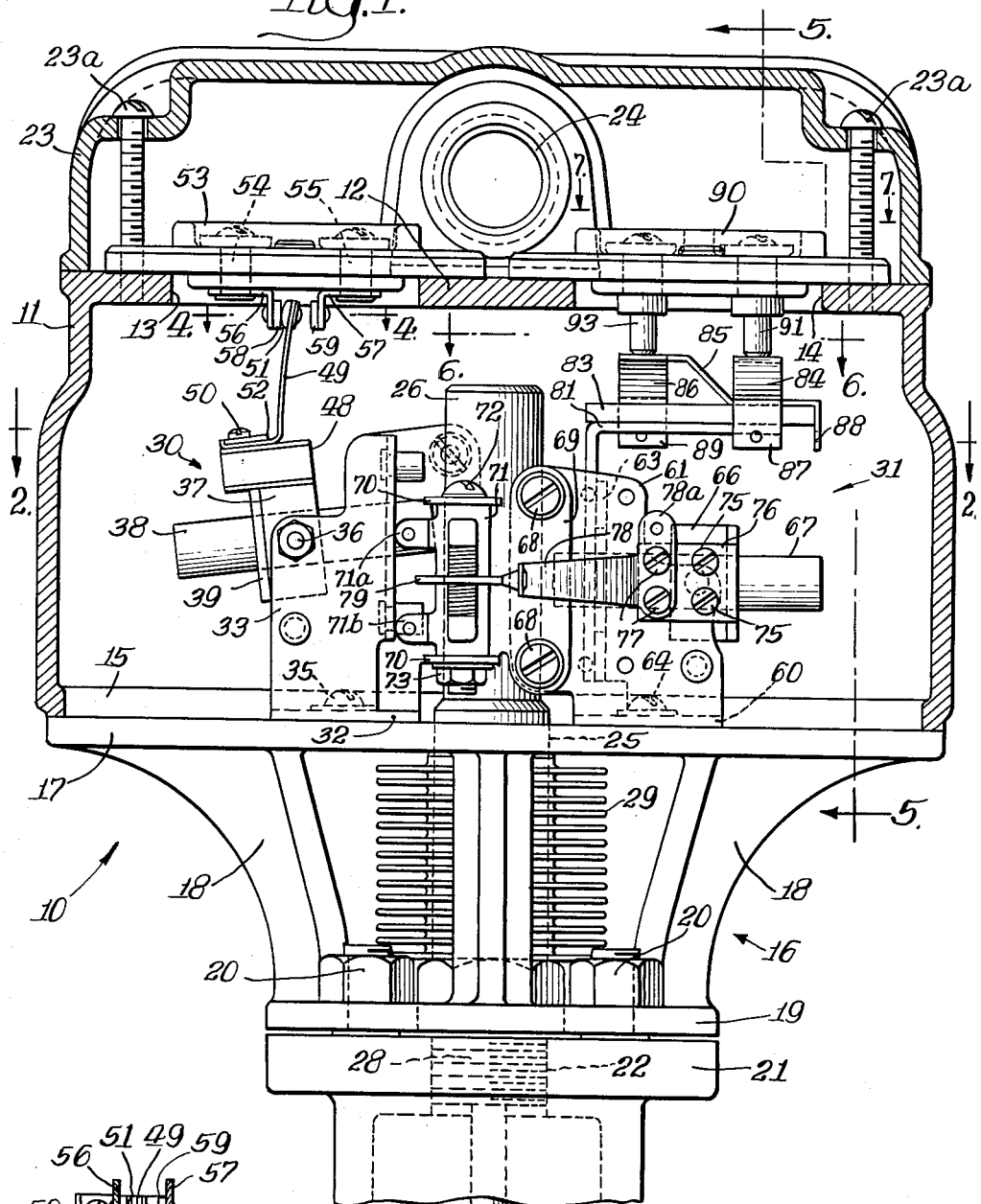
FIGURE 1 is a front elevational view of the control mechanism of our present invention, with portions being broken away and shown in section.

Referring now to FIGURE 1, there is indicated generally by the reference numeral 10 the level controlled switch mechanism of our present invention. The mechanism 10 comprises a main housing 11 having an upper horizontal wall portion 12 with openings 13 and 14 formed therein, and having a lower inwardly directed circumferentially continuous flange portion 15 defining a generally open bottom end. The housing 11 is supported on a frame 16 comprised of an upper horizontal plate portion 17, upstanding circumferentially spaced leg portions 18, and a lower horizontal ring portion 19. The upper frame plate 17 is suitably secured to the underside of the housing flange 15 by means of screws 17a (FIG- URE 5), and the frame ring 19 is suitably anchored by bolts 20 to a wall 21 of a float housing about an opening 22 formed therein. An upper closure or cover member 23 is removably secured to the top side of the housing 11 by means of machine screws 23a. Suitable brackets 24 are mounted on the horizontal wall 12 centrally of and at opposite side edges thereof and are formed with internally threaded apertures through which current conducting leads extend in a conventional manner.

A central opening 25 is formed in the supporting frame plate 17 vertically above the float housing wall opening 22. Extending through the opening 25 is a vertical tubular dome member 26 having a closed upper and an open lower end. The tubular enclosure 26 is fabricated of a non-magnetic material, such as brass or bronze. The upper end of the tubular member 26 projects into the housing 11 and the lower end is provided with a coupling 28 that is threaded into the float housing wall opening 22. A finned housing member 29 is pressed fit about the tubular member 26 within the confines of the supporting frame 16, and extends between the underside of the supporting frame plate 17 and the supporting frame ring 19. The housing member 29 serves to dissipate heat from the float housing and thus protects the mechanism within housing 11. The dome 26 closes off the interior of the main housing 11 from pressure within the boiler float housing to which the assembly 10 is attached.

Mounted within the main housing 11 adjacent the dome 26 are a switch assembly 30 and a rheostat or potentiometer assembly 31.

The switch assembly 30, as shown in FIGURES 1 and 2, comprises a generally U-shaped bracket member 32 having laterally spaced vertical arm portions 33 and 34. The bight portion of the bracket 32 is secured, as by screws 35, to the upper surface of the supporting frame plate 17. A pair of pivot pins 36, aligned on a horizontal axis, are adjustably secured in the bracket arms 33 and 34 and serve to pivotally support a magnet housing 37 of non-magnetic material. The housing 37 receives a bar magnet 38 axially therethrough and tightly grips the same so that the magnet moves pivotally with the housing between the bracket arms 33 and 34 on the axis of the pivot pins 36. The one end of the bar magnet 38 terminates adajacent the dome 26.

In order to limit the extent of pivotal movement of the magnet 38, a strap member 39 is secured to the back side of the magnet housing 37 and is formed with a forwardly projecting lateral arm portion 40 that parallels the bracket arm 34 on the outboard side thereof. As shown in FIGURE 3, a cooperating pair of vertically spaced stop members 41 are pivotally mounted at 42 to the bracket arm 34. Each of the stop members 41 is formed with a generally horizontal intermediate slot 43 which receives the offset head portion 44 of an adjustment screw threaded into the bracket arm 34. A generally vertical slot 45 is also formed in each of the stop members 41, on the opposite side of the intermediate slot 43 as the pivot 42, and disposed therethrough is a lock screw 46 threaded into the bracket arm 34. Each of the stop members 41 is further provided with a lateral projection 47 that extends across the plane of the strap arm 40. By loosening the lock screws 46 and turning the offset head portions 44, the lateral projections 47 may be moved toward or away from the strap arm 40 to thereby adjust the limits of maximum pivotal movement of the latter. After the stop members 41 have been suitably located, the lock screws 46 are tightened.

Figure 4:
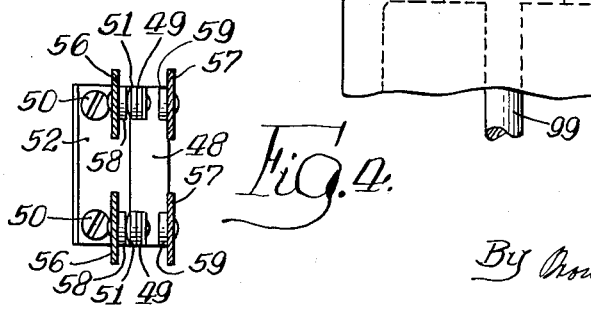
FIGURE 4 is a partial horizontal sectional view, taken substantially along the line 4—4 in FIGURE 1, looking in the direction indicated by the arrows.

Mounted to the upper side of the magnet housing 37, as shown in FIGURES 1 and 4, is an insulator block 48 which supports a pair of vertically extending resilient contact arms 49. Each of the contact arms 49 comprises a resilient leaf spring member attached at its lower end to the insulator block 48 by screws 50. Each of the contact arms 49 is further provided with a silver contact button 51 at its upper end. The pair of contact arms 49 are also interconnected at their lower ends by a metal strip 52 held in place by the screws 50. The magnet housing 37, magnet 38, insulator block 48 and contact arms 49 are adapted to be pivoted as a unit about the axis of the pivot pins 36.

Disposed across and extending into the opening 13 in the upper wall 12 of the main housing 11 is an insulated terminal plate 53 carrying pairs of terminal contact screws 54 and 55. The insulated terminal plate 53 is suitably secured to the main housing wall 12 by means of machine screws (not shown). The pairs of contact terminals 54 and 55 are provided at their lower ends with dependingly mounted contact supporting fingers 56 and 57, respectively, which support silver contact buttons 58 and 59 aligned properly to permit circuit closing contact with the pair of silver contact buttons 51 mounted at the upper ends of the arcuately movable contact arms 49. From the above description, it will be realized that rocking actuation of the magnet 38 in the appropriate direction permits alternate circuit closure either between the pair of contact buttons 58 associated with the pair of terminals 54 or between the pair of contact buttons 59 associated with the pair of terminals 55. In the preferred application of the control mechanism of our present invention, the terminals 54 are connected in a circuit for controlling, for example, energization of a burner for heating the water in a boiler, and the terminals 55 are connected in a circuit for controlling energization of a visual or audible alarm system.

The rheostat or potentiometer assembly 31, as shown in FIGURES 1 and 2, comprises a generally box-like bracket member 60 having laterally spaced vertical side arm portions 61 and 62 and a vertical transverse forward wall portion 63. The bight portion of the bracket member 60 is secured, as by screws 64, to the upper surface of the supporting frame plate 17. A pair of pivot pins 65, aligned on a horizontal axis, are adjustably secured in the bracket arms 61 and 62 and serve to pivotally support a magnet housing 66 of non-magnetic material. The housing 66 receives a bar magnet 67 axially therethrough and tightly grips the same so that the magnet moves pivotally with the housing between the bracket arms 61 and 62 on the axis of the pivot pins 65. The one end of the bar magnet 67 terminates adjacent the dome 26. The magnets 38 and 67 are arranged on opposite sides of the dome 26 with their axes lying substantially in a common vertical plane.

Secured to the forward edge of the bracket arm 61, by means of screws 68, is a rheostat holder 69. The rheostat holder 69 is provided with vertically spaced lateral flanges 70 between which is disposed a vertically extending rheostat or potentiometer 71 having terminals 71a and 71b. A bolt 72 is inserted downwardly through the holder flanges 70 and the rheostat 71, and a nut 73 is threaded on the lower end thereof for maintaining the rheostat 71 in assembled relationship. A transverse angle bracket 74 is suitably secured to the back side of the magnet housing 66 and mounted on the free leg of the bracket 74, by means of screws 75, is an insulating block 76. The insulating block 76 has secured thereto, as by screws 77, a resilient arm 78, with a terminal 78a, that carries a silver contact pointer 79 which is biased into engagement with the exposed windings or coil of the rheostat or potentiometer 71. The magnet housing 66, magnet 67, insulator block 76, resilient arm 78 and pointer 79 are adapted to be pivoted as a unit about the axis of the pivot pins 65, whereby the pointer 79 is movable across the face of the rheostat 71 to effect a modulating control of the resistance thereof.

Secured to the front wall of the box-like bracket member 60, by means of screws 80, is an inverted L-shaped supporting member 81. Suitably affixed to the horizontal leg portion of the supporting member 81, as by means of rivets 82, is an insulation plate 83. As shown in FIGURES 1, 5 and 6, three generally Z-shaped leaf spring contact members 84, 85 and 86 have their lower horizontal leg portions suitably riveted to the insulation plate 83. The free ends of the lower horizontal legs of the contact members 84, 85 and 86 are formed, respectively, with depending terminal portions 87, 88 and 89. Mounted over the opening 14 in the main housing wall 12 and projecting therein is an insulated terminal plate 90 (FIGURES 1 and 7) carrying terminal pins 91, 92 and 93. The insulated terminal plate 90 is fastened to the main housing wall 12 by means of a plurality of screws 94. The lower ends of the terminal pins 91, 92 and 93 project downwardly into the main housing 11 and, respectively, engage the upper horizontal leg portions of the leaf spring contact members 84, 85 and 86. The rheostat terminals 71a and 71b and the resilient arm terminal 78a are suitably connected by conductors to the leaf spring terminals 87, 88 and 89. In the preferred application of the control mechanism of our present invention, the terminals 91, 92 and 93 are connected in the circuit of an electrically controlled proportioning valve located in the boiler feedwater supply line. Variation in the effective resistance of the rheostat 71 due to movement of the pointer 79 thereover serves to regulate the degree of opening of the valve whereby to control the rate at which water is fed to the boiler. With the described arrangement, the rheostat 71 affords a modulating control of the boiler feed water valve.

Referring now to FIGURE 8, it will be seen that a bar magnet 95 is mounted for axial movement within the tubular enclosure or dome 26. The magnet 95 is housed within a non-magnetic sleeve 96 and is provided at its lower end with a plug member 97 having an axial bore 98 therein. Received in the bore 98 is the upper end of a generally vertical actuating rod 99. A mounting pin 100 extends transversely through the upper end of the rod 99 and is secured at its ends in the plug member 97. The lower end of the actuating rod 99 is connected through a pin 101 to the one end of a generally horizontal lever rod 102 having a spherical, hollow float member 103 secured to its other end. The lever rod 102 is connected intermediate of its ends, as at 104, to the one ends of a pair of laterally spaced leaf spring members 105. The other ends of the leaf spring members 105 are secured, as at 106, to a stationary bracket 107. This arrangement provides the required pivot or fulcrum for the float and rod. For further details of the construction and operation of the pivotal mounting means for the float rod 102, reference may be made to Patent No. 2,770,-695 granted to Leopold J. Kmiecik on November 13, 1956. When the water level rises or falls within the boiler, the float member 103 moves up and down in a corresponding direction and effects rectilinear movement of the magnet 95 through the interconnecting lever rod 102 and actuating rod 99.

In the preferred operation of our mechanism, the adjacent poles of the magnets 38 and 95 are of like polarity and the adjacent poles of the magnets 67 and 95 are of unlike polarity. For example, if the upper end of the magnet 95 is of north polarity, the adjacent ends of the magnets 38 and 67 will be of north and south polarity, respectively. With this arrangement, there is a repulsive effect between the magnets 38 and 95 and an attractive effect between the magnets 67 and 95.

We shall now describe in connection with FIGURES 9, 10 and 11 the manner in which the mechanism 10 of our present invention operates in response to changes in the water level within the boiler and the float housing with which the mechanism is associated. In the normal operating condition of the boiler and of our mechanism, as illustrated in FIGURE 9, it will be noted that the upper end of the magnet 95, which is the north polar end thereof, is positioned slightly below the axis of the magnet 38 and slightly above or on a line with the axis of magnet 67. Further it will be appreciated that the magnet 38 is positioned slightly above the magnet 67 so as to accommodate a desired sequential operation of the switch assembly 30 and the rheostat assembly 31 as will be explained presently.

In this position of the several magnets 38, 67 and 95, the north polar end of the magnet 95, being slightly below the axis of the north polar end of the magnet 38, causes a counterclockwise rotation of the latter magnet 38, due to the repulsive effect between the like magnetic poles thereof. When the magnet 38 is in the position shown in FIGURE 9, the terminal contacts 54 have their contact buttons 58 bridged by the pair of contact arms 49. At this time, a circuit is closed between the terminals 54 for controlling a burner for heating the water in the boiler. Also, in the described position of the several magnets 38, 67 and 95, due to the attraction between the south polar end of the magnet 67 and the unlike north polar end of the magnet 95, the magnet 67 will assume a generally horizontal position with the silver pointer 79 engaging the rheostat 71 at a point generally centrally of the ends thereof. When the rheostat pointer 79 is in this position, the proportioning valve controlled thereby is set at an opening whereby water is fed to the boiler at a rate at which the boiler load and feed water supply are balanced. So long as the water level is maintained at a normal operating level, the switch assembly 30 and the rheostat assembly 31 will remain in the operative positions shown in FIGURE 9.

Upon a gradual lowering of the water level within the boiler, due for example to an increase in the load on the boiler, the float member 103 moves responsively downwardly within the float housing causing the actuating rod 99 and magnet 95 to move upwardly. As the north polar end of the magnet 95 moves upwardly, the magnet 67 is rotated clockwise, due to the attractive effect between the adjacent unlike poles of these magnets. Such rotation of the magnet 67 causes the pointer 79 to move along the rheostat 71 in a direction changing the effective resistance thereof and increasing the opening of the feed water control valve so as to increase the rate of water being fed to the boiler. As the magnet 95 moves upwardly, it will eventually pass above the axis of the magnet 38. At that stage, the repulsive influence between the adjacent like polar ends of the magnets 38 and 95 causes a clockwise snap acting rotation of the magnet 38 to the position shown in FIGURE 10. During clockwise movement of the magnet 38, the circuit through the terminal contacts 54 is opened thereby de-energizing the burner for the boiler and the circuit through the contact terminals 55 is closed thereby energizing the visual or audible alarm system in the circuit therewith, indicating the shutting off of the burner. With the float member 103 in its lowermost position, as shown in FIGURE 10, the pointer 79 is positioned at that end of the rheostat 71 that conditions the feed water control valve for a maximum flow of water into the boiler, whereby to raise the water level therein.

As the water level rises within the boiler in response to the supply pump's operation, the float member 103 will responsively move upwardly within the float housing to reverse the above sequential operation of the switch assembly 30 and the rheostat assembly 31. That is, as the float member 103 moves upwardly, the actuating rod 99 and the magnet 95 will move progressively downwardly. As the magnet 95 moves downwardly, the magnet 67 will rotate counterclockwise due to the attractive effect between the adjacent unlike poles of these magnets. Rotation of the magnet 67 causes the pointer 79 to move along the rheostat 71 in a direction changing the effective resistance thereof and causing a decrease in the opening of the proportioning valve feeding the water to the boiler. When the north polar end of the magnet 95 eventually passes below the axis of the magnet 38, the repulsive influence between the adjacent like polar ends of the magnet 95 and the magnet 38 causes counterclockwise snap acting pivotal movement of the magnet 38. As a result, the circuit between the contact terminals 55 is opened thereby turning off the visible or audible alarm system and the circuit between the contact terminals 54 is closed for again energizing the burner for the boiler. With the water level again normal, the magnets 38, 67 and 95 will assume their normal operating positions shown in FIGURE 9.

In the event that the load on the boiler should further decrease causing the water level in the boiler to rise above normal, the float 103 will move responsively upwardly within the float housing effecting downward movement of the magnet 95 to the position shown in FIGURE 11. The magnet 67 will be correspondingly rotated counter-clockwise until the pointer 79 is positioned at that end of the rheostat 71 that conditions the feed water control valve for a minimum flow of water into the boiler, whereby to effect a decrease in the water level therein.

It will be appreciated that we have provided snap-acting switch means for opening and closing a burner control circuit and an alarm control circuit, and rheostat means for modulating or smoothly varying the flow of feed water to the boiler. It will be further appreciated that the desired timing of the sequential operation of the several circuits controlled by the magnets 38 and 67 may be regulated by the vertical spacing of the pivotal axes for such magnets and by vertical adjustment of the stop members 41 that serve to limit pivotal movement of the magnet 38.

While we have shown and described what we believe to be a preferred embodiment of our present invention, it will be understood by those skilled in the art that various rearrangements and modifications may be made therein without departing from the spirit and scope of our invention.

We claim:

1. In a boiler control, a wall of non-magnetic material, a primary two-pole bar magnet mounted for substantially longitudinal straight line movement in a path parallel to said wall along one side thereof, a secondary magnet mounted on the other side of said wall and having one pole disposed adjacent said wall at about the level of the unlike pole of said primary magnet whereby said poles attract each other, such magnetic attraction causing movement of said secondary magnet in response to movement of said primary magnet, and rheostat control means mechanically connected to said secondary magnet for movement therewith.

2. In a boiler control, a substantially vertical pressure retaining wall of non-magnetic material, a primary two-pole bar magnet having its longitudinal axis substantially parallel to said wall and mounted for motion in a substantially vertical direction along one side of said wall, means for effecting vertical movement of said primary magnet, a secondary bar magnet mounted on the other side of said wall and having one pole disposed adjacent said wall at about the level of the unlike pole of said primary magnet whereby said poles attract each other, such magnetic attraction causing movement of said secondary magnet in response to movement of said primary magnet, rheostat means comprised of a coil and a contact arm movable thereover, and said contact arm being mechanically connected to said secondary magnet for movement therewith whereby to effect a modulating control of the effective resistance of said rheostat means.

3. In a boiler control for use with a boiler, a substantially vertical pressure retaining wall of non-magnetic material, a primary two-pole bar magnet having its longitudinal axis substantially parallel to said wall and mounted for motion in a substantially vertical direction along one side of said wall, a float member connected with said primary magnet and serving to effect vertical movement of the latter in response to liquid level changes within the boiler, a secondary bar magnet pivotally mounted on the other side of said wall for swinging motion in a vertical plane with its longitudinal axis generally horizontal and having one pole disposed adjacent said wall at about the level of the unlike pole of said primary magnet whereby said poles attract each other, such magnetic attraction causing movement of said secondary magnet in response to movement of said primary magnet, rheostat means comprised of a coil and a contact arm movable thereover, and said contact arm being mechanically connected to said secondary magnet for movement therewith whereby to effect a modulating control of the effective resistance of said rheostat means in relation to liquid level changes within the boiler.

4. In a boiler control for use with a boiler, a plate having an opening therethrough, a tube made of non-magnetic material having one end seated in said opening and the other end closed off, a primary two-pole bar magnet movable endwise in said tube, a float member connected with said primary magnet and serving to effect endwise movement of the latter in response to liquid level changes within the boiler, a secondary bar magnet mounted exteriorly of said tube and having one pole disposed adjacent the outside wall of said tube at about the level of the unlike pole of said primary magnet whereby said poles attract each other, such magnetic attraction causing movement of said secondary magnet in response to movement of said primary magnet, rheostat means comprised of a coil and a contact arm movable thereover, and said contact arm being mechanically connected to said secondary magnet for movement therewith whereby to effect a modulating control of the effective resistance of said rheostat means in relation to liquid level changes within the boiler.

5. In a boiler control, a tubular enclosure of non-magnetic material, a primary two-pole bar magnet movable endwise in said tubular enclosure, a secondary bar magnet mounted exteriorly of said tubular enclosure and having one pole disposed adjacent the wall thereof at about the level of the unlike pole of said primary magnet whereby said poles attract each other, such magnetic attraction causing movement of said secondary magnet in response to movement of said primary magnet, a tertiary bar magnet mounted exteriorly of said tubular enclosure and having one pole disposed adjacent the wall thereof at about the level of the like pole of said primary magnet whereby said poles repel each other, said magnetic repulsion causing movement of said tertiary magnet in response to movement of said primary magnet within said tubular enclosure, rheostat means comprised of a coil and a contact arm movable thereover, said contact arm being mechanically connected to said secondary magnet for movement therewith whereby to effect a modulating control of the effective resistance of said rheostat means, and switch means, means responsive to movement of said tertiary magnet for actuating said switch means.

6. In a boiler control for use with a boiler, a tubular enclosure of non-magnetic material, a primary two-pole bar magnet movable endwise in said tubular enclosure, a float member connected with said primary magnet and serving to effect endwise movement of the latter in response to liquid level changes within the boiler, a secondary bar magnet mounted exteriorly of said tubular enclosure and having one pole disposed adjacent the wall thereof at about the level of the unlike pole of said primary magnet whereby said poles attract each other, such magnetic attraction causing movement of said secondary magnet in response to movement of said primary magnet, a tertiary bar magnet mounted exteriorly of said tubular enclosure and having one pole disposed adjacent the wall thereof at about the level of the like pole of said primary magnet whereby said poles repel each other, said magnetic repulsion causing movement of said tertiary magnet in response to movement of said primary magnet within said tubular enclosure, rheostat means comprised of a coil and a contact arm movable thereover, said contact arm being mechanically connected to said secondary magnet for movement therewith whereby to effect a modulating control of the effective resistance of said rheostat means, and switch means, means responsive to movement of said tertiary magnet for actuating said switch means.

References Cited by the Examiner

UNITED STATES PATENTS

| | | | |
|---|---|---|---|
| 1,727,344 | 9/29 | Huggins | 338—33 |
| 1,876,044 | 9/32 | Davis | 200—84.3 X |
| 2,198,055 | 4/40 | Liner | 338—200 X |
| 2,537,733 | 1/51 | Brenner | 338—164 X |
| 2,612,572 | 9/52 | Binford | 200—84.3 |
| 2,671,834 | 3/54 | Kmiecik | 200—84.3 |
| 2,770,695 | 11/56 | Kmiecik | 200—84 |

FOREIGN PATENTS 817,284    7/59    Great Britain.

RICHARD M. WOOD, *Primary Examiner.*